(12) United States Patent
Kuroda

(10) Patent No.: US 11,256,455 B2
(45) Date of Patent: Feb. 22, 2022

(54) SERVER GENERATES URL AND ONE TIME KEY

(71) Applicant: CANON KABUSHIKI KAISHA, Tokyo (JP)

(72) Inventor: Shigeki Kuroda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/198,718

(22) Filed: Mar. 11, 2021

(65) Prior Publication Data
US 2021/0294547 A1    Sep. 23, 2021

(30) Foreign Application Priority Data
Mar. 23, 2020 (JP) .............................. JP2020-051013

(51) Int. Cl.
*H04N 1/00* (2006.01)
*G06F 3/12* (2006.01)
*H04W 12/06* (2021.01)

(52) U.S. Cl.
CPC .......... *G06F 3/1238* (2013.01); *G06F 3/1204* (2013.01); *G06F 3/1236* (2013.01); *G06F 3/1285* (2013.01); *H04N 1/00209* (2013.01); *H04N 1/00477* (2013.01); *H04W 12/068* (2021.01)

(58) Field of Classification Search
None
See application file for complete search history.

(56) References Cited

U.S. PATENT DOCUMENTS

| | | | | | |
|---|---|---|---|---|---|
| 2009/0310787 | A1* | 12/2009 | Nishimi | ................. | H04L 67/34 380/277 |
| 2012/0243038 | A1* | 9/2012 | Saeda | ................... | G06F 3/1267 358/1.15 |
| 2014/0104638 | A1* | 4/2014 | Kato | ....................... | H04N 1/44 358/1.14 |
| 2015/0015909 | A1* | 1/2015 | Kaida | ................... | G06F 21/608 358/1.14 |
| 2015/0181054 | A1* | 6/2015 | Hayakawa | ............ | G06F 3/1203 358/1.15 |
| 2015/0319142 | A1* | 11/2015 | Herberg | .............. | H04L 63/0428 713/171 |
| 2019/0278798 | A1* | 9/2019 | Kishi | .................... | G06F 16/532 |

FOREIGN PATENT DOCUMENTS

JP        2004342038 A    12/2004

* cited by examiner

*Primary Examiner* — Haris Sabah
(74) *Attorney, Agent, or Firm* — Rossi, Kimms & McDowell LLP

(57) ABSTRACT

In response to receiving an e-mail of a print job from a client terminal, a print server generates a job code and a print setting URL for the print job and returns the generated job code and print setting URL to the client terminal. Further, when the print setting URL is accessed, a print setting screen is provided to the client terminal. Accordingly, it is possible to easily perform print setting on the print job transmitted via an e-mail and then perform printing.

10 Claims, 13 Drawing Sheets

FIG. 7

| No. | JOB CODE | PRINT SETTING URL | MAIL ADDRESS | PRINT SETTING INFORMATION | DATA FILE | JOB ACCEPT DATE AND TIME |
|---|---|---|---|---|---|---|
| 1 | 12301 | Https://printservice.example.com/pr23412 | user1@example1ml.com | COLOR MODE: COLOR<br>DUPLEX PRINT<br>NUP: NO<br>STAPLE: YES<br>POSITION: RIGHT-UPPER | Sample1.pdf | 2019/12/01 10:10 |
| 2 | 56702 | Https://printservice.example.com/pr67813 | user2@example2ml.com | COLOR MODE: COLOR<br>DUPLEX PRINT<br>NUP: 2<br>STAPLE: NO<br>POSITION: NON | Sample2.pdf<br>Sample3.pdf | 2019/12/01 10:20 |
| 3 | | | | | | |

FIG. 13

| No. | PRINTER NAME | PRINTER IDENTIFICATION ID | REGISTRATION STATE | COLOR MODE | DUPLEX | STAPLE |
|---|---|---|---|---|---|---|
| 1 | Printer_1 | 111.111.111.111 | REGISTERED | MONO | DUPLEX | YES |
| 2 | Printer_2 | 222.222.222.222 | REGISTERED | COLOR | DUPLEX | NO |
| 3 | Printer_3 |  | NOT REGISTERED | COLOR | DUPLEX | YES |

SERVER GENERATES URL AND ONE TIME KEY

BACKGROUND OF THE INVENTION

Field of the Invention

The present invention relates to a printing control method and a server apparatus used when printing is performed on a print job transmitted from an external terminal by using an electronic mail.

Description of the Related Art

Conventionally, a printing system in which a client terminal or the like of a user transmits a print job to a print server connected to a printing apparatus via an electronic mail (hereinafter, referred to as "e-mail"), and the printing apparatus specifies and prints a print job is known. In recent years, such a print server may be further configured to be present on cloud connected by the Internet or the like.

In this situation, in response to receiving a print job from the client terminal of the user, the print server generates a job code corresponding to the print job and transmits the generated job code to the client terminal of the user via an e-mail. When the user inputs the transmitted job code via an operation panel of the printing apparatus connected to the print server, the printing apparatus prints the print job.

When the print job is printed, print setting for a color mode, duplex printing, or the like is often performed. For example, when the printing apparatus is a multifunctional apparatus, a method of selecting a job to be printed, displaying a print setting screen, and thereby performing print setting when a user inputs a job code via an operation panel of a printing apparatus is known.

Further, Japanese Patent Application Laid-Open No. 2004-342038 discloses a system in which a PDL file based on the specified print condition is attached to an e-mail having a mail message body and an attached image file, the e-mail is transmitted to a printing apparatus, and print setting is performed when the print job is transmitted via an e-mail.

However, a print job transmitted via an e-mail may be printed by a printing apparatus having an operation panel having no touch panel. In such a case, since the operation panel of the printing apparatus can only display a simple character string or accept input, the user is unable to easily perform print setting by displaying a print setting screen or the like.

Further, a print job transmitted via an e-mail may be printed by a printing apparatus having no print setting function. In such a case, print setting is unable to be performed, and a job is printed immediately after a job code is input.

Moreover, in Japanese Patent Application Laid-Open No. 2004-342038, there is a problem of inability of easily performing print setting, for example, because a PDL file to be printed is required to be generated on a user client terminal side and the client terminal side is thus required to have a function of generating a PDL file.

In view of the above problems, the present invention intends to provide a printing control method and a server apparatus that can easily perform print setting for a print job transmitted via an e-mail.

SUMMARY OF THE INVENTION

The present invention provides a printing control method of performing mail reception and printing, and the method includes: receiving an electronic mail including print data transmitted from an information processing terminal and storing the print data; generating a one-time key required when a user starts printing of the print data and storing the generated one-time key in association with the print data; generating a URL required for accessing a setting screen used for setting a condition used when printing of a print job is performed; and transmitting the generated URL and the generated one-time key to a user who transmitted an electronic mail including the print data.

Further features of the present invention will become apparent from the following description of exemplary embodiments with reference to the attached drawings.

BRIEF DESCRIPTION OF THE DRAWINGS

FIG. 7 illustrates an example of a print setting data table.

FIG. 13 illustrates an example of a printer information table.

DESCRIPTION OF THE EMBODIMENTS

Each embodiment for implementing the present invention will be described below with reference to the drawings. Note that the embodiments described below are only examples and do not intend to limit the scope of the present invention. Further, not all of combinations of features described in each embodiment below are necessarily essential to the solution in the present invention.

First Embodiment

Figure 1:
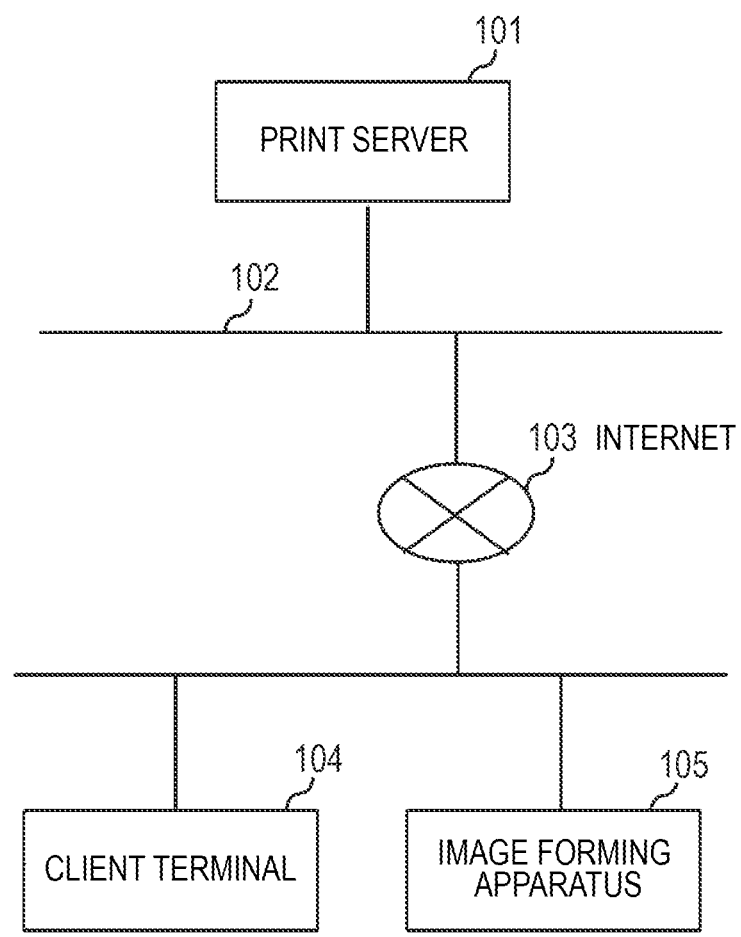
FIG. 1 illustrates an overall configuration of a printing system.

First, a first embodiment of the present invention will be described. FIG. 1 is a diagram illustrating an overall configuration of a printing system 100 in the first embodiment. The printing system 100 has each apparatus of a print server 101, a client terminal 104, and an image forming apparatus 105. The respective apparatuses are connected to each other by a wireless or wired network formed of a local area network (LAN) 102 or the Internet 103.

The image forming apparatus 105 has a printer function of printing an input print job on a sheet in the printing system 100 of the present embodiment. The image forming apparatus 105 is formed as a printing apparatus and may be a Multi-Function Peripheral (MFP) or may be a Single Function Peripheral (SFP), for example. When a print job is input from a print server 101 or an external device (not illustrated) via the LAN 102 or the Internet 103, for example, the image forming apparatus 105 generates a print image based on the print job and prints the print image on a sheet.

The client terminal 104 functions as an information processing terminal that inputs a print job in the printing system 100 of the present embodiment. The client terminal 104 is formed of a mobile terminal, a tablet terminal, a PC terminal for personal use, or the like. The client terminal 104 has a mail client function of transmitting and receiving an e-mail via the LAN 102 or the Internet 103, a web browser function of browsing a website, or the like.

The print server 101 has a function as an information processing device that provides a solution to perform print setting to the client terminal 104 in the printing system 100 of the present embodiment. The print server 101 has functions of providing a service program to the client terminal 104 or the image forming apparatus 105 or executing a server application. The print server 101 may be arranged on the cloud on the Internet or may be arranged on the LAN 102. Further, the print server 101 is not limited to being configured as a single information processing apparatus, and the image forming apparatus 105 may also have a function of the print server 101.

While the configuration in which the printing system 100 is formed of the client terminal 104, the image forming apparatus 105, and the print server 101 is illustrated in FIG. 1, the configuration is not limited thereto. For example, the plurality of image forming apparatuses may be connected.

Figure 2:
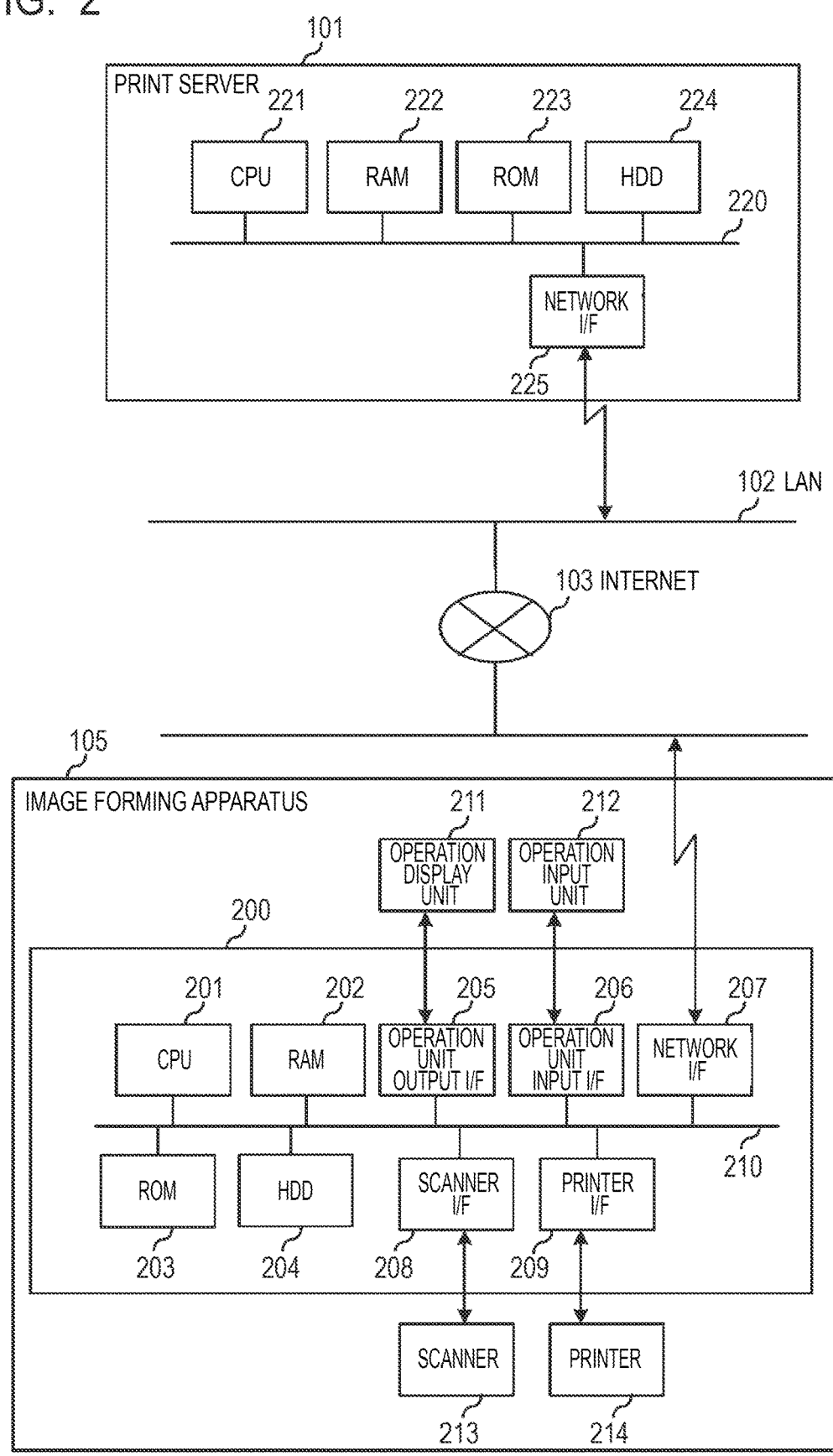
FIG. 2 illustrates a hardware configuration of an image forming device and a print server.

FIG. 2 is a block diagram illustrating a hardware configuration of the image forming apparatus 105 and the print server 101. First, the hardware configuration of the image forming apparatus 105 will be described. The image forming apparatus 105 has a controller unit 200 that can connect a scanner 213 and a printer 214 to each other and can connect an operation display unit 211, an operation input unit 212, and the LAN 102 to each other.

The controller unit 200 has a central processing unit (CPU) 201. The controller unit 200 further has devices such as a random access memory (RAM) 202, a read only memory (ROM) 203, and a hard disk drive (HDD) 204. The controller unit 200 further has devices such as an operation unit output interface (I/F) 205, an operation unit input I/F 206, a network I/F 207, a scanner I/F 208, and a printer I/F 209.

The CPU 201 executes various control programs. Specifically, the CPU 201 starts up a system based on a boot program stored in the ROM 203. The CPU 201 further reads a control program stored in the HDD 204 on the system and performs a predetermined process by using the RAM 202 as a working area. The HDD 204 stores various control programs. The HDD 204 further stores scanned data read from the scanner 213 or data acquired from the external device via the network I/F 207.

The operation unit output I/F 205 controls data output communication to the operation display unit 211. The operation unit input I/F 206 controls data input communication from the operation input unit 212. The network I/F 207 is connected to the LAN 102 and controls input/output of transmission and reception of various information, print data, and image data via the LAN 102 or the Internet 103. The scanner I/F 208 inputs image data from the scanner 213 and inputs/outputs scanner control data. The printer I/F 209 outputs image data to the printer 214 and inputs/outputs printer control data. The above devices 201 to 209 are arranged on a system bus 210.

The operation input unit 212 has an input device such as a touch panel or a hard key and is an instruction input interface from the user. The operation display unit 211 has a display device such as a liquid crystal display (LCD) or a light emitting diode (LED) and is a display interface to the user. The operation display unit 211 has a function of displaying various operation screens of copying, printing, or the like and a screen of status information such as a printing status provided in the image forming apparatus 105. The printing system 100 of the present embodiment is useful in particular when applied to a low-cost image forming apparatus 105 in which a function of the operation input unit 212 or the operation display unit 211 is restricted.

The scanner 213 has an optical reading device such as a charge coupled device (CCD) and has a function of scanning a paper medium optically and reading the scanned paper medium as electronic image data. The printer 214 has a function of forming the electronic image data as an image on a recording medium such as a sheet.

Next, the hardware configuration of the print server 101 will be described. The print server 101 has devices such as the CPU 221, the RAM 222, the ROM 223, the HDD 224, and the network I/F 225. The devices 221 to 225 are arranged on an internal bus 220.

The CPU 221 executes a program stored in the ROM 223 and collectively controls the respective devices 221 to 225 via the internal bus 220. The HDD 224 functions as an external storage device and functions as a data storage region storing information related to a print job described later.

The network I/F 225 transfers data in a bidirectional manner with the image forming apparatus 105, the client terminal 104, and an external device (not illustrated) via the LAN 102 or the Internet 103. The network I/F 225 further controls input/output of transmission and reception of various information, print data, and image data. Further, the hardware configurations of the image forming apparatus 105 and the print server 101 are not limited to the illustrated configuration. For example, when the image forming apparatus 105 incorporates the above functions included in the print server 101, the image forming apparatus 105 may also have the functions of the print server 101.

Figure 3:
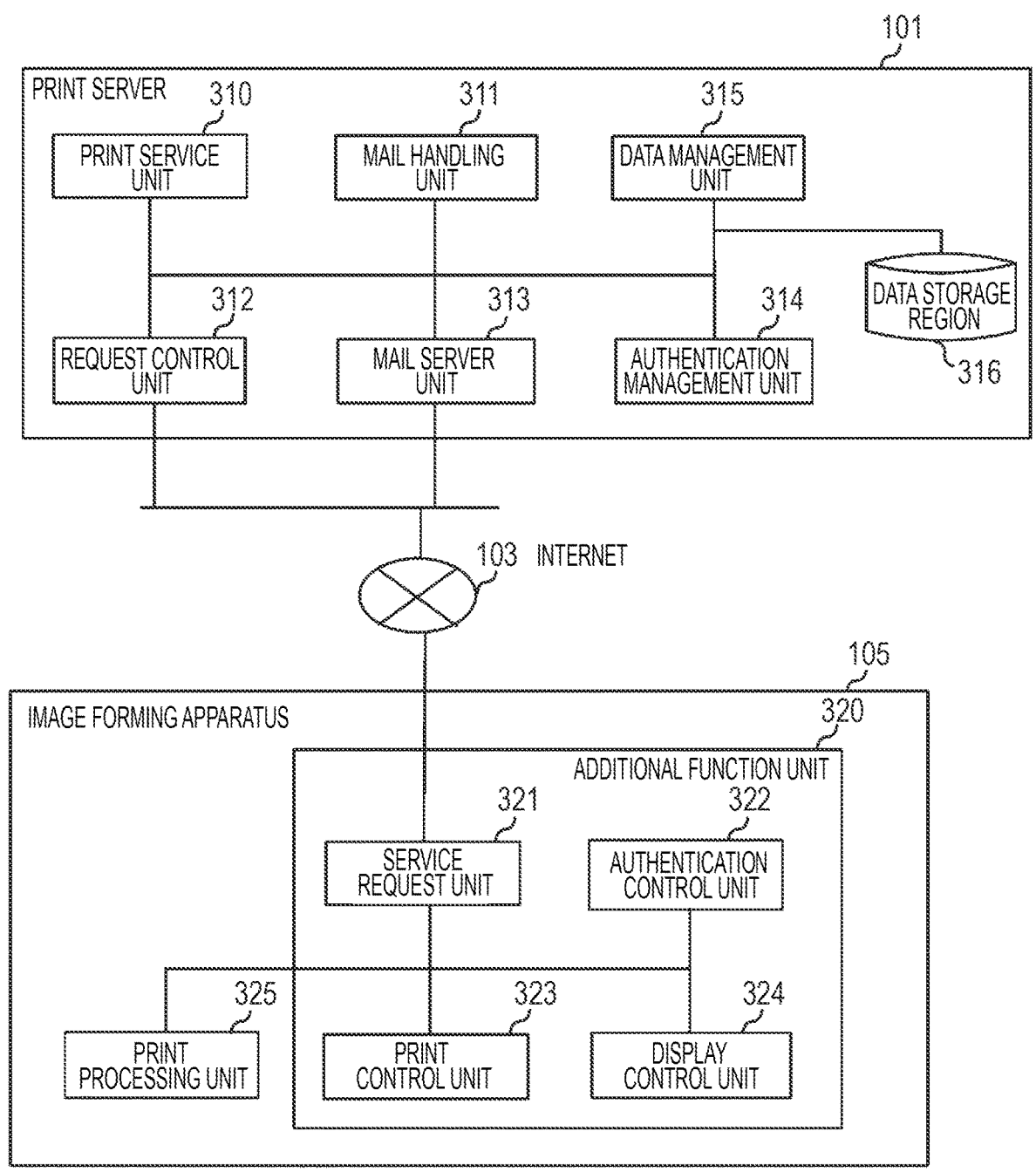
FIG. 3 illustrates a software configuration of an image forming device and a print server.

FIG. 3 is a block diagram illustrating a software configuration of the image forming apparatus 105 and the print server 101. First, the software configuration of the print server 101 will be described. The print server 101 has function units for providing print services. Specifically, the print server 101 has a print service unit 310, a mail handling unit 311, a request control unit 312, a mail server unit 313, an authentication management unit 314, and a data management unit 315. Each function unit is realized when the CPU 221 in the print server 101 reads and executes a control program stored in the ROM 223 or the HDD 224.

The print server 101 further has a data storage region 316. The data storage region 316 can be present in the HDD 224 or the RAM 222.

In response to receiving a job process request from the mail handling unit 311 or the request control unit 312, the print service unit 310 performs a process related to printing such as generation of a print job. The print service unit 310 further performs a process of notifying the request source of the result of these job process requests. The print service unit 310 further communicates with the image forming apparatus 105 and transmits the generated print job to the image forming apparatus 105. Moreover, the print service unit 310 also has a function of, for example, generating a print setting screen that can be accessed from a web browser described later.

The request control unit 312 stands by in a state of being ready to receive a request from an external device. In response to receiving a process request, the request control unit 312 instructs the print service unit 310 as appropriate, the authentication management unit 314, and the data management unit 315 to perform a process in accordance with the request. Specifically, the request control unit 312 performs a process in response to access from the client terminal 104 and the request from the image forming apparatus 105. The request control unit 312 further determines the access destination or access information for these requests. Furthermore, the request control unit 312 can perform an authentication process in authentication. Herein, regarding the authentication process, the authentication process can also be performed by instructing an authentication management unit 314 described later to perform a process and receiving the result. Moreover, the request control unit 312 provides a print setting screen or the like that can be accessed from a web browser described later and functions as a web service application that enables an operation.

The mail server unit 313 has a mail buffer function and has a function as an e-mail server of the print server 101. That is, the mail server unit 313 has a function of receiving an e-mail from an externally connected terminal such as a client terminal 104 as a receiving server such as a POP server or an IMAP server. Moreover, the mail server unit 313 also has a function as a transmission server such as an SMTP server that transmits an e-mail, for example. Note that the mail server unit 313 is arranged in the print server 101 in FIG. 3 but may be arranged outside the print server 101 as a mail server that can be accessed via the LAN 102 or the Internet 103. Moreover, the mail server unit 313 may have a function related to security such as detoxification of an e-mail or anti-spam/anti-virus other than a transmission/reception function of an e-mail.

The mail handling unit 311 communicates with the mail server unit 313 and acquires an e-mail received by the mail server unit 313. In acquisition of an e-mail, the mail handling unit 311 performs polling on the mail server unit 313 at a regular interval, and acquires e-mail data after confirming the reception of an e-mail, for example. Further, the mail server unit 313 also issues an instruction to delete the received e-mail or the like. Further, the mail handling unit 311 also has a function of transferring data used for transmitting an e-mail to the mail server unit 313. Moreover, the mail handling unit 311 can analyze the content of the acquired e-mail data and determine whether or not the e-mail data is described in a correct format.

In response to receiving an instruction from each function unit in the print server 101, the data management unit 315 performs a process related to data storage and acquisition. Specifically, each function unit of the print service unit 310, the request control unit 312, the mail handling unit 311, and the authentication management unit 314 stores and acquires necessary data via the data management unit 315. Illustration will be provided below assuming that data storage in the print server 101 is performed by these respective function units via the data management unit 315. Further, the data management unit 315 stores various data in the data storage region 316 and acquires various data from the data storage region 316 if necessary.

The authentication management unit 314 performs user management and user authentication processes for accessing the print service unit 310 and the printing system 100. Specifically, in response to receiving a request from the request control unit 312 or the image forming apparatus 105, the authentication management unit 314 performs a process of authenticating whether or not the user information is correct and performs notification of the result. The user authentication process can be performed by acquiring and determining user information stored in the data storage region 316 in advance. As the user information, an e-mail address of the user can also be stored. Further, a PIN code of the user can be stored for the purpose of using the PIN code for a user authentication process. Further, when the authentication management unit 314 accepts a request such as addition, deletion, or correction of a user, the authentication management unit 314 also performs a process of updating the user information stored in the data storage region 316 or the like.

Next, the software configuration of the image forming apparatus 105 will be described. The image forming apparatus 105 is divided into two units of an addition function unit 320 and a native function unit (not illustrated). Each function unit included in the native function unit is typically provided in the image forming apparatus 105. On the other hand, each function unit included in the addition function unit 320 is an application additionally installed in the image forming apparatus 105. The addition function unit 320 is an application based on Java (registered trademark), and addition of a function to the image forming apparatus 105 can be easily implemented. Note that another additional application (not illustrated) may be installed in the image forming apparatus 105.

The native function unit has a print processing unit 325. The addition function unit 320 has a service request unit 321, an authentication control unit 322, a print control unit 323, and a display control unit 324.

The service request unit 321 requests the print server 101 to perform various processes. For example, the service request unit 321 requests authentication for login to the image forming apparatus 105, transmits authentication information required for printing, or requests a print job. The service request unit 321 uses a protocol such as REST or SOAP for transfer with the print server 101 and may use another communication scheme.

In response to receiving an instruction from the display control unit 324, the authentication control unit 322 performs an authentication process related to login to the image forming apparatus 105. Regarding the authentication process, the authentication control unit 322 can request the print server 101 to perform an authentication and can also perform the authentication process in accordance with the authentication result.

The print control unit 323 receives a print job in accordance with the job print request from the print server 101 and instructs the print processing unit 325 to print a job. Then, when printing is completed, the print control unit 323 issues a completion notification to the print control unit 323.

The display control unit 324 displays a UI screen used for accepting an operation by the user on a liquid crystal display unit with a touch panel function that is an operation display unit 211 of the image forming apparatus 105. For example, the display control unit 324 displays various information related to input of authentication information used for accessing the print server 101, a print start operation, and a print operation or error information in the image forming apparatus 105. Moreover, the display control unit 324 has a function of transmitting the input information to the service request unit 321 in accordance with the input instruction from the operation input unit 212 of the image forming apparatus 105.

In the present embodiment, in response to receiving a print job via an e-mail from the client terminal 104, the print server 101 returns a mail describing a job code required for performing a print job and a uniform resource locator (URL) (print setting URL) required for performing print setting. The job code is a code associated with each print job and is authentication information required for performing a print job in the image forming apparatus 105. Further, the print setting URL is a URL to access a print setting screen for performing print setting such as a color mode or duplex printing that is a condition in performing a print job. Note that the URL is address information used for accessing information on a network such as the Internet. The print server 101 further accepts access to a URL from the client terminal 104 and sets print setting information to a print job.

Figure 4:
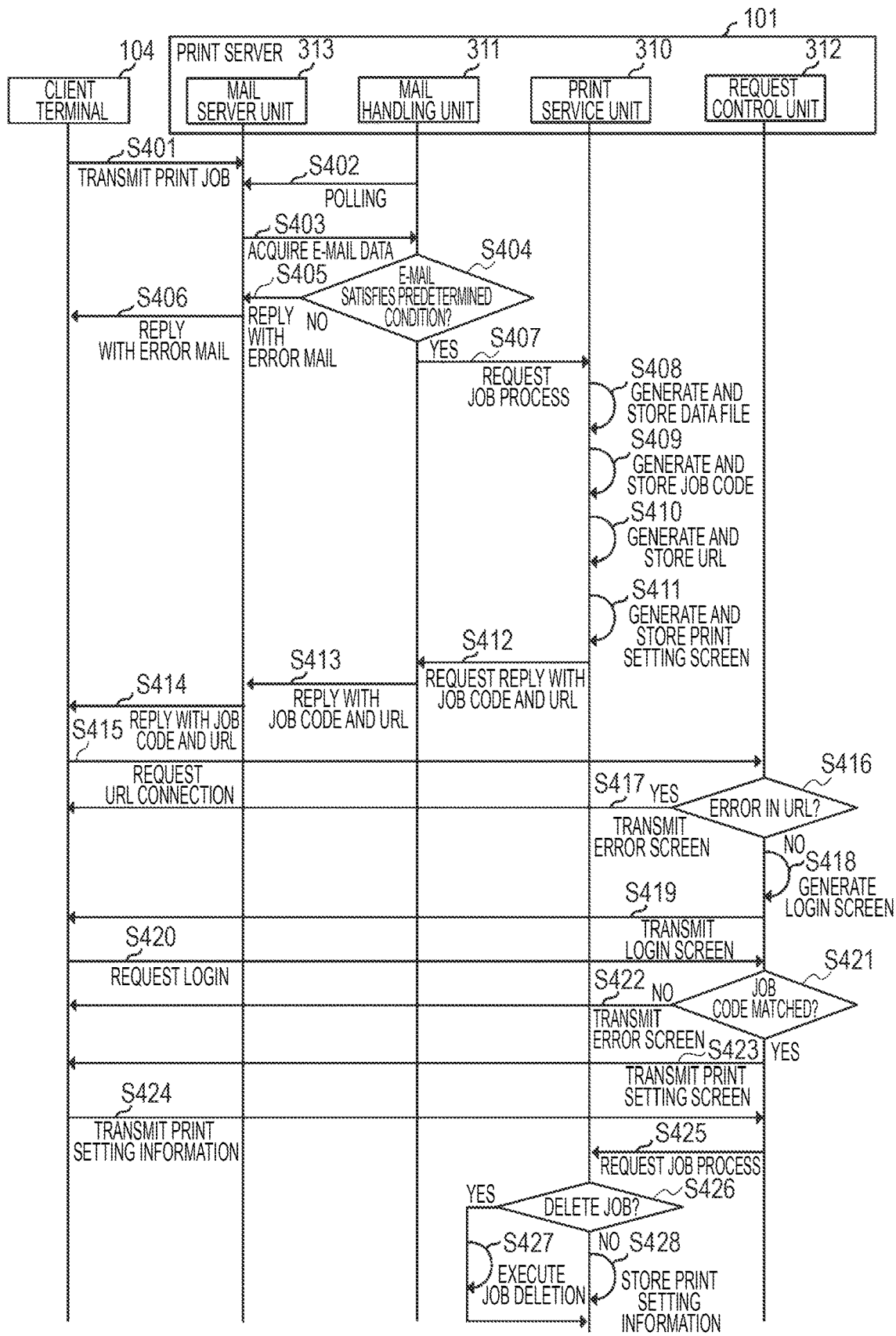
FIG. 4 illustrates a sequence from transmission of a print job to print setting.

FIG. 4 is a diagram illustrating a sequence from transmission of a print job to print setting completion in the first embodiment. In the sequence illustrated in FIG. 4, the operation of each software module unit that controls the print server 101 is implemented when the CPU 221 executes a program. The program executed by the CPU 221 is stored in the ROM 223 or the HDD 224, loaded into the RAM 222 by the CPU 221, and executed by the CPU 221. Note that data transmission and reception processes or the like are implemented in cooperation of respective I/Fs or respective hardware components.

First, in step S401, the client terminal 104 transmits a print job to the print server 101 based on an instruction of the user. The print job is transmitted in a form in which a file that is a print target is attached to an e-mail by using a mail client function of the client terminal. As a print target, the content of a mail message body or both of the attached file and the content of a mail message body can be instructed. Further, a transmission destination address of an e-mail is defined for each print server in advance, and the user transmits an e-mail to an address of the print server from which the user intends to have a print service. Furthermore, the user who transmits a print job is not required to be preregistered in the print server from which the user has a print service. The print job transmitted by the client terminal 104 in step S401 is received by the mail server unit 313 of the print server 101.

Next, in step S402, the mail handling unit 311 of the print server 101 performs polling on the mail server unit 313 at a regular interval and confirms whether or not there is reception of an e-mail.

Next, in step S403, in response to confirming the reception of an e-mail, the mail handling unit 311 acquires the content of the e-mail (e-mail data). The e-mail data includes a header portion including an e-mail address of a mail sender, a message body, an attached file, or the like.

Next, in step S404, the mail handling unit 311 determines whether or not a predetermined condition is met such as whether or not an attached file is included in the e-mail data acquired in step S403 or whether or not an extension of the attached file is defined in advance. If there is no attached file but printing of the attached file is instructed, or if the extension of the attached file does not match one defined in advance, the mail handling unit 311 determines that the e-mail data does not meet the predetermined condition, and the process proceeds to step S405.

In step S405, the mail handling unit 311 returns an error mail describing the error content to the mail server unit 313.

Next, in step S406, the mail server unit 313 returns the error mail transmitted by the mail handling unit 311 in step S405 to the client terminal 104 (mail address that is a mail sender). If it is determined that the e-mail data meets a predetermined condition in step S404, the process proceeds to step S407.

In step S407, the mail handling unit 311 identifies a print job and requests the print service unit 310 to process the print job. In the print job process request, the mail handling unit 311 can also transfer the acquired e-mail data to the print service unit 310 to request for a process.

Next, in step S408, the print service unit 310 identifies a print job based on the acquired e-mail data and generates a data file of the print job. The print service unit 310 then stores the data file. In identification of a print job, for example, when only an attached file is printed, the print service unit 310 identifies the attached file as a data file of the print job. When there are a plurality of attached files, a data file can also be generated for each attached file. Further, a mail message body and an attached file can also be generated as separate data files. In the present embodiment, when data files of the plurality of print jobs are generated from a single piece of e-mail data, these data files are collectively handled as one print job. The respective data files can also be handled as a separate print job. Further, regarding generation of a data file of a print job, a PDL file may be generated from an attached file or the like by using a printer driver or the like defined in advance. When the image forming apparatus 105 can directly print a message body or an attached file of e-mail data, the e-mail data can also be stored as it stands as a data file of a print job. Further, it is also possible to store a mail address portion of the e-mail data transferred from the mail handling unit 311 when a print job process is requested in step S407.

Next, in step S409, the print service unit 310 generates a job code associated with the print job identified in step S408 and stores the value thereof.

Next, in step S410, the print service unit 310 generates a print setting URL associated with the print job and stores the value thereof. The print setting URL is generated as a value that can be connected to the request control unit 312 in the print server 101. Further, since the print setting URL is generated in association with each print job generated in step S408, the print setting URL is not duplicated with the print setting URL generated for another print job.

Next, in step S411, the print service unit 310 generates and stores a print setting screen that can be accessed by using the print setting URL generated in step S410.

Next, in step S412, the print service unit 310 requests the mail handling unit 311 to transmit, to the sender, a reply mail describing a job code generated in step S409 and a print setting URL generated in step S410. Herein, the print service unit 310 determines whether or not the sender is a registered user in accordance with whether or not the mail address of e-mail data acquired in step S403 matches a mail address of an existing user. Further, if it is determined that the sender is a registered user, it is also possible to request the mail handling unit 311 to return only the print setting URL to the sender of an e-mail without transmitting a job code. In such a case, although not illustrated in FIG. 4, the print service unit 310 inquires of the authentication management unit 314 whether or not the sender is a registered user. Further, in such a case, the job code is used for only internal management by the print service unit 310.

Next, in step S413, the mail handling unit 311 transfers a reply mail describing the job code and the print setting URL requested in step S412 to the mail server unit 313.

Next, in step S414, the mail server unit 313 returns a reply mail transferred from the mail handling unit 311 in step S413 to the client terminal 104 (the mail address that is a sender of the mail). Accordingly, the client terminal 104 and the sender who transmitted a print job can acquire a job code and a print setting URL.

Next, in step S415, the client terminal 104 accesses the transferred print setting URL and issues a connection request to the request control unit 312. Herein, by clicking the print setting URL in the reply mail displayed on a screen of the mail client function of the client terminal 104, the user can access a print setting screen. At this time, a web browser function of the client terminal 104 starts up, and the client terminal 104 will wait for a response from the connected URL.

Next, in step S416, the request control unit 312 accepts the connection request from the client terminal 104 and determines whether or not the connected URL is generated in step S410 and is present as a stored print setting URL. If there is no print setting URL, the URL is regarded to be incorrect, and the process proceeds to step S417.

In step S417, the request control unit 312 transmits an error screen to the client terminal 104 that is an access source. Accordingly, the client terminal 104 waiting for a response from the request control unit 312 in step S415 displays an error screen through an internal web browser function. If there is a print setting URL in step S416, the URL is not regarded to be incorrect, the process proceeds to step S418.

In step S418, the request control unit 312 generates a login screen used for entry of a job code as authentication information corresponding to the print setting URL generated in step S410. Since a print setting URL is associated with a print job, it is possible to perform authentication by determining whether or not the print setting URL matches the job code generated at the same time. Note that, although a job code is used as authentication information here, it is also possible to have the user enter a user mail address as authentication information to determine whether or not the user mail address is a user mail address corresponding to the print setting URL. Moreover, in a case where the user is a registered user, it is possible to have the user enter a PIN code as user authentication information to perform the determination.

Next, in step S419, the request control unit 312 transmits the login screen generated in step S418 to the client terminal 104 that is an access source. Accordingly, the client terminal 104 waiting for a response from the request control unit 312 in step S415 displays a login screen through an internal web browser function.

Next, in step S420, the client terminal 104 transmits authentication information input by the user operation in the displayed login screen to the request control unit 312 and requests login.

Next, in step S421, the request control unit 312 accepts a login request from the client terminal 104 and determines whether or not the input authentication information matches the job code generated in step S409. If it is determined that there is no match, the process proceeds to step S422.

In step S422, the request control unit 312 transmits an error screen indicating that authentication is unsuccessful to the client terminal 104 that has requested login. Accordingly, the client terminal 104 displays an error screen through the internal web browser function. On the other hand, if the request control unit 312 determines that the authentication information input in step S421 matches the job code, the process proceeds to step S423.

In step S423, the request control unit 312 transmits the print setting screen generated and stored in step S411 to the client terminal 104 that is an access source. Thereby, the client terminal 104 displays a print setting screen through an internal web browser function. Note that each authentication step from step S418 to step S422 may be omitted. In such a case, if the URL is not regarded to be incorrect in the URL determination of step S416, the process proceeds to step S423.

Next, in step S424, the client terminal 104 transmits the print setting information set by the user operation to the request control unit 312. Herein, the user can set print setting information by operating the print setting screen displayed on a screen by a web browser function of the client terminal 104. The user may fix print setting information by pressing a transmission button displayed on the print setting screen or the like.

Next, in step S425, in response to acquiring the print setting information transmitted from the client terminal 104, the request control unit 312 transmits the print setting information to the print service unit 310 and requests the print job process.

Next, in step S426, the print service unit 310 determines whether or not there is a deletion instruction of a print job in the print setting information received in step S425. If there is a deletion instruction of a print job in the print setting information, the process proceeds to step S427, and the corresponding print job is deleted. If there is no deletion instruction of a print job in the print setting information, the process proceeds to step S428.

In step S428, the print service unit 310 stores the received print setting information in association with a print job. Note that the print service unit 310 can also inform the client terminal 104 of the result of print job deletion in step S427 or the result of print setting information storage in step S428.

Figure 5:
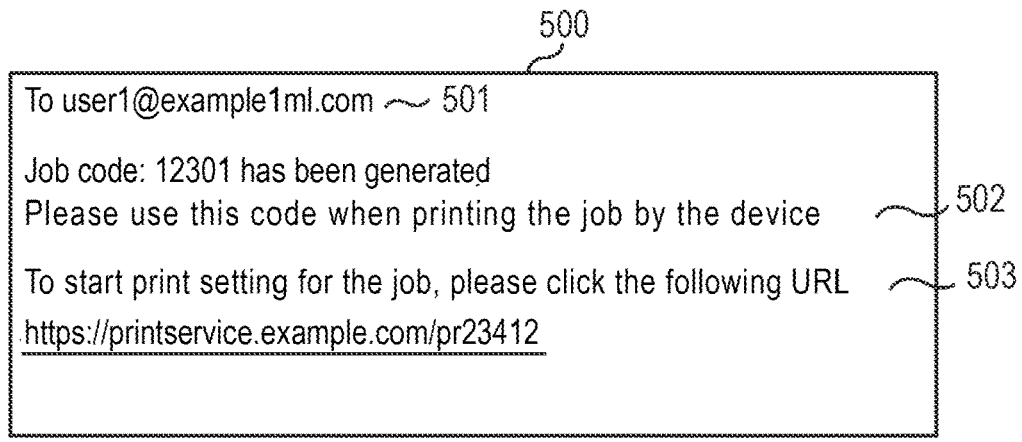
FIG. 5 illustrates an example of a reply mail.

Next, a reply mail describing a job code and a print setting URL will be described with reference to FIG. 5. FIG. 5 is a diagram illustrating an example of a reply mail 500. A reply mail describing a job code and a print setting URL is transmitted from the mail server unit 313 to the client terminal 104 in step S414 of FIG. 4.

In the example of FIG. 5, a mail address 501 of a sender is displayed on the reply mail 500. Further, a job code 502 generated in step S409 of FIG. 4 and a print setting URL 503 generated in step S410 are displayed. As described with step S415 of FIG. 4, by clicking the print setting URL 503, the user can access the URL of the print setting screen and perform print setting. Note that, if it is determined to be a registered user in step S412 of FIG. 4 and there is no reply request of the job code, only the print setting URL 503 may be displayed without the job code 502 being displayed.

Figure 6:
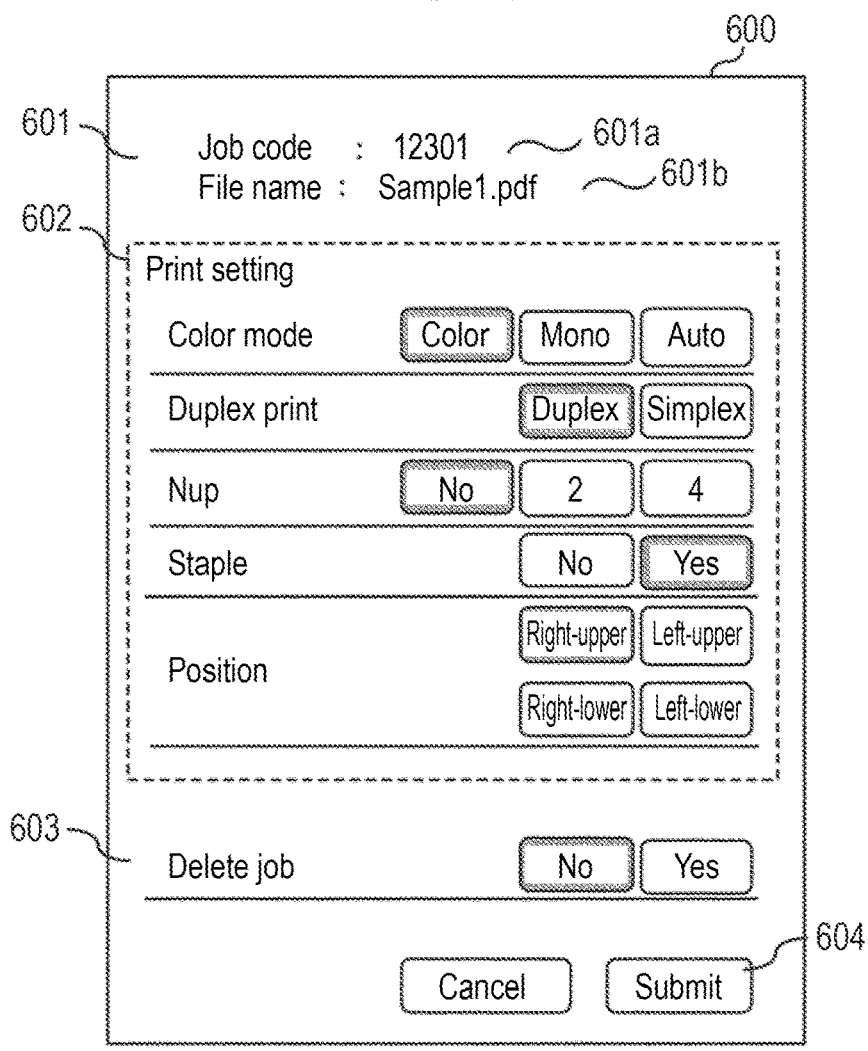
FIG. 6 illustrates an example of a print setting screen.

Next, the print setting screen will be described with reference to FIG. 6. FIG. 6 is a diagram illustrating an example of a print setting screen 600. The print setting screen 600 is generated by the print service unit 310 in step S411 of FIG. 4 and is transmitted from the request control unit 312 to the client terminal 104 in step S423.

In the example of FIG. 6, a job code 601*a* generated in step S409 of FIG. 4 and a data file name 601*b* of the print job generated in step S408 are displayed on the print setting screen 600 as information 601 related to a job.

As a print setting of a job, buttons used for setting respective setting items of a color mode, duplex printing, Nup, staple, and a position of staple are displayed on the print setting 602. Buttons of choices used for setting are displayed for each setting item. For example, in the case of a color mode, three buttons of color printing, monochrome printing, and automatic printing are displayed, and the user can set a color mode by pressing any one of the buttons. The three buttons are exclusive, and when any one button is pressed, selection of the remaining buttons is cancelled. Each setting may be displayed in a state where a default print setting has been selected.

When the user intends to delete a print job, the user selects "Yes" button in a setting item of a job deletion 603. When the transmission button 604 is pressed, the print setting information (or job deletion) is transmitted to the request control unit 312 in step S424 of FIG. 4.

FIG. 7 is a diagram illustrating an example of a print setting data table 700. The print setting data table 700 is a table that stores job data, a data file of a print job, print setting information, or the like generated or acquired in each step in FIG. 4.

In the example of the print setting data table 700 of FIG. 7, the column "701" represents a print job ID used for uniquely identifying a print job. The print setting data table 700 stores a job code 702 generated in step S409, a print setting URL 703 generated in step S410, and a data file 706 generated in step S408. The plurality of data files 706 may be present. The print setting data table 700 further stores a sender mail address 704 acquired from the e-mail data in step S403 and print setting information 705 acquired in step S424. Further, the print setting data table 700 stores a job acceptance date and time 707 that is the time the e-mail data is acquired. As described above, the job code 702, the print setting URL 703, the print setting information 705, and the like are uniquely associated with one job code, respectively, and stored in the print setting data table 700.

Figure 8:
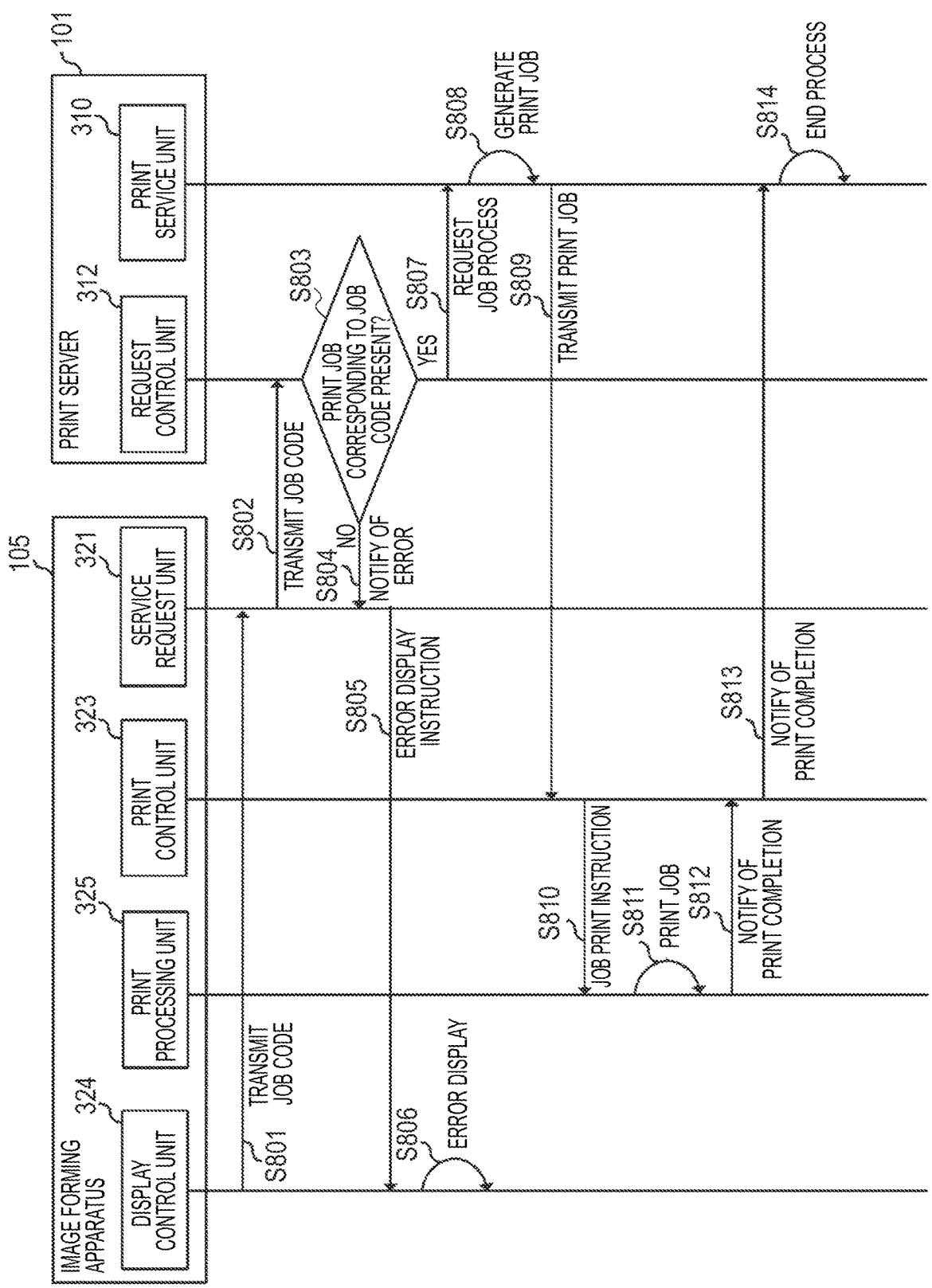
FIG. 8 illustrates a sequence from print setting to print completion.

FIG. 8 is a diagram illustrating a sequence from completion of print setting to completion of printing at the image forming apparatus 105. In the present embodiment, when a job code is input at the operation input unit 212 of the image forming apparatus 105, the image forming apparatus 105 performs printing based on the set print setting. In the sequence illustrated in FIG. 8, the operation of each software module unit that controls the print server 101 is implemented when the CPU 221 executes a program. The program executed by the CPU 221 is stored in the ROM 223 or the HDD 224, loaded into the RAM 222 by the CPU 221, and executed by the CPU 221. Note that data transmission and reception processes or the like are implemented in cooperation of respective I/Fs or respective hardware components.

First, in step S801, the display control unit 324 of the image forming apparatus 105 transmits a job code input by a user operation to the service request unit 321.

Next, in step S802, the service request unit 321 transmits the received job code to the print server 101. The print server 101 receives the transmitted job code at the request control unit 312.

Next, in step S803, the request control unit 312 determines whether or not a print job corresponding to the job code received from the service request unit 321 is present. Specifically, the request control unit 312 references the print setting data table 700 described with FIG. 7 to determine whether or not there is a print job corresponding to the job code of interest. If it is determined that there is no print job corresponding to the job code of interest, the request control unit 312 proceeds with the process to step S804. On the other hand, if it is determined that there is a print job corresponding to the job code of interest, the request control unit 312 proceeds with the process to step S807.

In step S804, the request control unit 312 issues an error notification to the effect that there is no job code to the service request unit 321.

Next, in step S805, the service request unit 321 instructs the display control unit 324 to display error display to the effect that there is no job code based on the received error notification.

Next, in step S806, the display control unit 324 displays an error screen on the operation display unit 211 of the image forming apparatus 105. If there is a corresponding job code in step S803, the process proceeds to step S807.

In step S807, the request control unit 312 requests the print service unit 310 to process the job corresponding to the received job code.

Next, in step S808, the print service unit 310 generates a print job for which the process request has been made. Specifically, the print service unit 310 references the print setting data table 700, acquires the print setting information 705 corresponding to the corresponding job code, and adds the acquired print setting information to the data file acquired from the data file 706 of the print job. Furthermore, the print service unit 310 adds header information or the like used for printing the job to generate a print job.

Next, in step S809, the print service unit 310 transmits the generated print job to the print control unit 323 of the image forming apparatus 105.

Next, in step S810, the print control unit 323 issues a print instruction for the print job to the print processing unit 325 in order to print the received print job.

Next, in step S811, the print processing unit 325 prints the print job based on the print instruction in S810. Next, in step S812, the print processing unit 325 issues a print completion notification to the effect that the printing of the print job is completed to the print control unit 323.

Next, in step S813, the print control unit 323 notifies the print service unit 310 in the print server 101 of the print completion notification.

Next, in step S814, the print service unit 310 deletes the print setting data associated with the job code for the completed printing from the print setting data table 700 and updates the print setting data table 700. Further, the print service unit 310 deletes the print job data.

Note that transfer of data or the like between the image forming apparatus 105 and the print server 101 can also be performed always via the service request unit 321 and the request control unit 312 rather than performed directly by respective function units.

Next, a case where it is determined in step S412 of FIG. 4 that the user is the registered user and only a URL is returned will be described similarly with reference to FIG. 8. First, the display control unit 324 displays an input unit used for entry of a job code or a PIN code, and the user selects PIN code entry. Then, in step S801, the display control unit 324 transmits the PIN code input by a user operation to the service request unit 321. Next, in step S802, the service request unit 321 transmits the received PIN code to the print server 101. The print server 101 receives the transmitted PIN code at the request control unit 312.

Next, in step S803, the request control unit 312 determines whether or not the PIN code received from the service request unit 321 is correct. Specifically, the service request unit 321 inquires of the authentication management unit 314 whether or not the received PIN code corresponds to the registered user. If the user is not a registered user (no corresponding PIN code is present), error display to the effect that no corresponding PIN code is present is performed from step S804 to step S806. If a corresponding PIN code is present, the service request unit 321 acquires an e-mail address for the registered user corresponding to the PIN code from the authentication management unit 314, and the process proceeds to step S807.

In step S807, the request control unit 312 requests the print service unit 310 to process the job corresponding to the acquired e-mail address.

Next, in step S808, the print service unit 310 generates a print job for which the process request has been made. Specifically, the print service unit 310 references the print setting data table 700, acquires the print setting information 705 corresponding to the e-mail address of interest, and adds the acquired print setting information to the job data file acquired from the data file 706. Furthermore, the print service unit 310 adds header information or the like used for printing the job to generate a print job. In such a case, a plurality of print jobs may be generated.

Since the process on and after step S809 is the same as that described above, the description thereof will be omitted. Note that, when a plurality of jobs are generated, the plurality of jobs can be printed in the subsequent steps.

Figure 9:
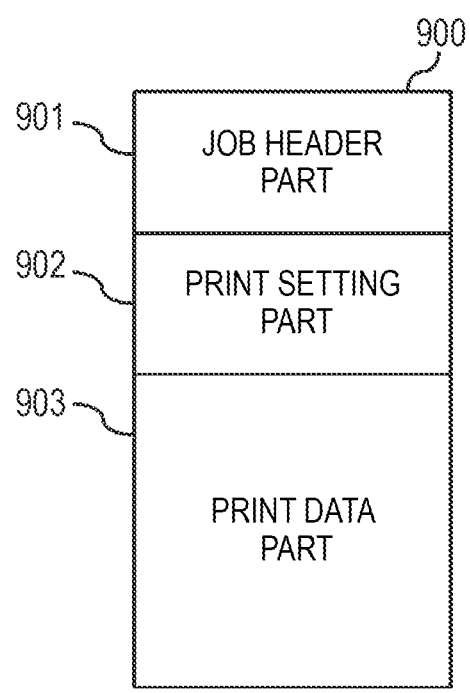
FIG. 9 illustrates an internal configuration of a print job.

FIG. 9 is a schematic diagram of print data illustrating the internal configuration of the print job generated in step S808 of FIG. 8. In FIG. 9, the print job 900 is formed of a job header part 901, a print setting part 902, and a print data part 903. The job header part 901 stores the header information generated in step S808 of FIG. 8. The print setting part 902 stores the print setting information acquired from the print setting data table 700 similarly in step S808 in a form of print data. Further, the print data part 903 is referenced from the print setting data table 700 and stores the data file 706 generated in step S408.

As described above, in the first embodiment, in response to receiving a print job via e-mail from the client terminal 104, the print server 101 returns a reply mail describing a job code required for printing of the job at the image forming apparatus 105 and a URL required for print setting. This enables the user to perform the print setting at the client terminal 104 and then get the print job printed.

Second Embodiment

Next, the second embodiment of the present invention will be described. In the first embodiment, in response to receiving a print job by an e-mail from an external client terminal, the print server transmits a reply mail describing a job code and a print setting URL required for printing of the job from the image forming apparatus.

In contrast, in the second embodiment, in response to receiving a print job by an e-mail from an external client terminal, the print server transmits a reply mail describing a job code required for printing of the job from the image forming apparatus and a print setting template required for print setting. The print server then sets, to a print job, print setting information returned from the client terminal via an e-mail. Note that, since the configuration of the printing system 100 or the like is the same as the first embodiment, the description thereof will be omitted, and features different from the first embodiment will be mainly described here.

Figure 10:
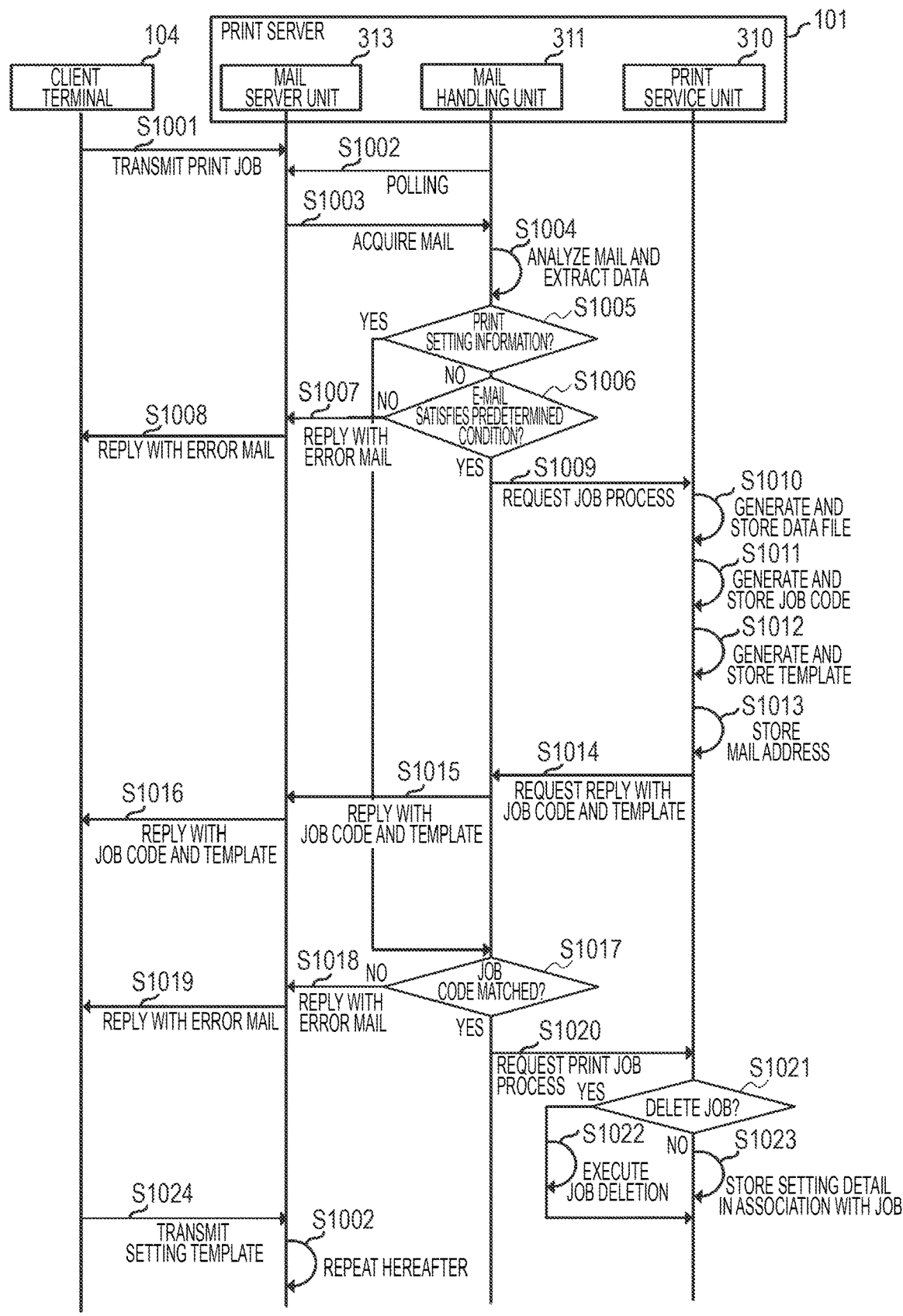
FIG. 10 illustrates a sequence from transmission of a print job to print setting (second embodiment).

FIG. 10 is a diagram illustrating a sequence from transmission of a print job to completion of print setting in the second embodiment, which is a modified example of the sequence of FIG. 4 described in the first embodiment. In the sequence described in FIG. 10, the operation of each software module unit that controls the print server 101 is implemented by the CPU 221 executing a program. The program executed by the CPU 221 is stored in advance in the ROM 223 or the HDD 224, loaded into the RAM 222 by the CPU 221, and executed by the CPU 221. Note that data transmission and reception processes or the like are implemented in cooperation of respective I/Fs or respective hardware components.

Since step S1001 to step S1003 are the same as step S401 to step S403 of FIG. 4 described in the first embodiment, the description thereof will be omitted.

In step S1004, the mail handling unit 311 analyzes e-mail data acquired in step S1003. In the present embodiment, the e-mail data acquired by the mail handling unit 311 in step S1003 includes not only a mail including a data file of a print job as described previously but also a mail used for print job setting described later. In step S1004, the mail handling unit 311 determines whether the acquired e-mail data is of a mail including a data file of a print job (data file mail) or a mail used for print setting (print setting mail).

Analysis of e-mail data performed in step S1004 will now be described. In this example, it is analyzed whether or not the content of the message body or the header information of the e-mail data conforms to the syntax of a predetermined print setting template or the like, for example. The print setting template is generated by the print service unit 310 and returned as an e-mail to the client terminal 104 as described later. Thus, by analyzing whether or not a print setting template is included in the e-mail data, it is possible to determine whether the e-mail data is of a data file mail or a print setting mail.

For example, it is analyzed whether or not a predetermined character string or keyword is included or arranged in the message body of the e-mail in the order defined by a print setting template or the like. Further, it is analyzed whether or not the subject of the header includes a character string defined by a template or the like.

Furthermore, if the message body includes a character string, a job code, or the like regarding print setting information defined by a print setting template such as "color mode", "Duplex print", or the like, for example, these values are extracted. Further, a mail address of a sender in the header of the E-mail data is also extracted. Further, if the print setting template is a template including a descriptive language such as HTML, and JAVASCRIPT (registered trademark) instead of a plain text, by analyzing the syntax of HTML or the like in the same manner, it is possible to extract print setting information.

Next, the process proceeds to step S1005, the mail handling unit 311 determines whether or not the e-mail data analyzed in step S1004 is of a print setting mail. If no print setting information is extracted in step S1004, the e-mail data is not determined to be of a print setting mail, and the process proceeds to step S1006. On the other hand, if print setting information is extracted in step S1004, the e-mail data is determined to be of a print setting mail, and the process proceeds to step S1017.

First, a case where the e-mail data acquired in step S1003 is not of a print setting mail will now be described. Since it has already been determined in step S1005 that the e-mail data acquired in step S1003 is not of a print setting mail, it is then determined whether or not the e-mail data is of a data file mail.

Since step S1006 to step S1011 are the same as step S404 to step S409 of FIG. 4 described in the first embodiment, the description thereof will be omitted.

In step S1012, the print service unit 310 generates and stores a print setting template used for print setting. The print setting template may be created by the print service unit 310 and stored in the data storage region 316 in advance. In such a case, the print setting template is acquired via the data management unit 315. In the print setting template, syntaxes or the like are defined in accordance with rules. The content of a print setting template may be configured as a plain text or may include a descriptive language such as HTML, and JAVASCRIPT (registered trademark) that can be sent by mail.

Next, in step S1013, the print service unit 310 stores a sender mail address in association with a print setting template generated and stored in step S1012.

Next, in step S1014, the print service unit 310 requests the mail handling unit 311 to return the job code and the content of the print setting template generated in step S1012 to the e-mail sender.

Next, in step S1015, the mail handling unit 311 transmits, to the mail server unit 313, a reply mail describing the job code and the content of the print setting template requested in step S1014.

Next, in step S1016, the mail server unit 313 returns the reply mail, which has been transmitted by the mail handling unit 311 in step S1015, to the client terminal 104 (the sender mail address of the mail). This enables the sender who transmitted the job to acquire the job code and the print template used for print setting at the client terminal 104.

On the other hand, if the e-mail data analyzed in step S1004 is determined to be of a print setting mail in step S1005, the process proceeds to step S1017.

In step S1017, the mail handling unit 311 determines whether or not the job code extracted in step S1004 matches the job code generated in step S1011. If it is determined that there is a match, the process proceeds to step S1018.

In step S1018, the mail handling unit 311 returns an error mail describing error details to the mail server unit 313. Next, in step S1019, the mail server unit 313 returns the error mail, which has been transmitted by the mail handling unit 311 in step S1018, to the client terminal 104 (the sender mail address of the mail).

If it is determined that there is no match in step S1017, the process proceeds to step S1020. In step S1020, the mail handling unit 311 acquires the print setting information extracted in step S1004, transmits the print setting information to the print service unit 310, and requests the print service unit 310 to process the print job.

Since step S1021 to step S1023 are the same as step S426 to step S428 of FIG. 4 described in the first embodiment, the description thereof will be omitted.

In step S1024, the client terminal 104 transmits the print setting template to the print server 101 based on a user instruction. Herein, the user edits the content of the print setting template received as a reply mail by the client terminal 104 in step S1016 and sends the received reply mail in an edited form by using a mail client function of the client terminal 104. That is, based on a user instruction, the client terminal 104 transmits the edited print setting template to the same mail address as that used when transmitting the print job to the mail server unit 313 in step S1001. The print setting template transmitted by the client terminal 104 in step S1024 is received by the mail server unit 313 of the print server 101.

The subsequent steps correspond to repetition of the process on and after step S1002 described previously. That is, the print setting template received by the mail server unit 313 in step S1024 is processed in step S1002 to step S1005 and then processed in step S1017 to step S1023.

Figure 11:
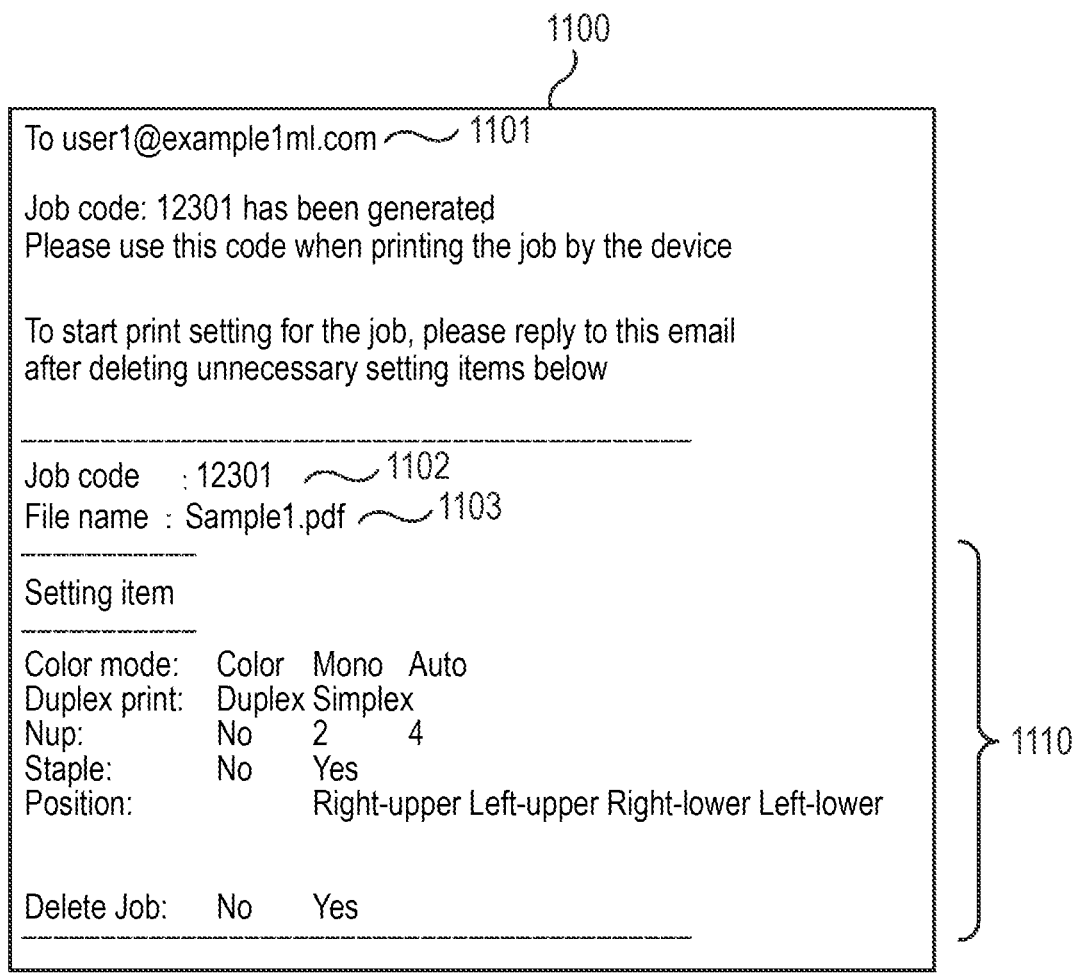
FIG. 11 illustrates an example of a reply mail (second embodiment).

Next, a reply mail describing a job code and a print setting template will be described with reference to FIG. 11. FIG. 11 illustrates an example of a reply mail 1100. A reply mail describing a job code and a print setting template is that transmitted from the mail server unit 313 to the client terminal 104 in step S1016 of FIG. 10.

In the example of FIG. 11, a sender mail address 1101 is displayed in the reply mail 1100. Further, a job code 1102 generated in step S1011 of FIG. 10 and a data file name 1103 of a print job sent by the user in step S1001 of FIG. 10 are displayed. Furthermore, a print setting template 1110 used for print setting acquired in step S1012 is displayed in the reply mail 1100.

In the print setting template 1110, a screen used for setting respective setting items such as a color mode, duplex printing, Nup, staple, and a position of staple is displayed as print setting information. In each setting item, a text of choices such as "Yes", "No" or the like for a setting is displayed. When performing print setting for a print job, the user may delete one or more unnecessary choices and leave one or more choices to be set from respective setting items. Further, when deleting a job, the user may delete a choice of "No" in job deletion setting item and leave a choice of "Yes".

Figure 12:
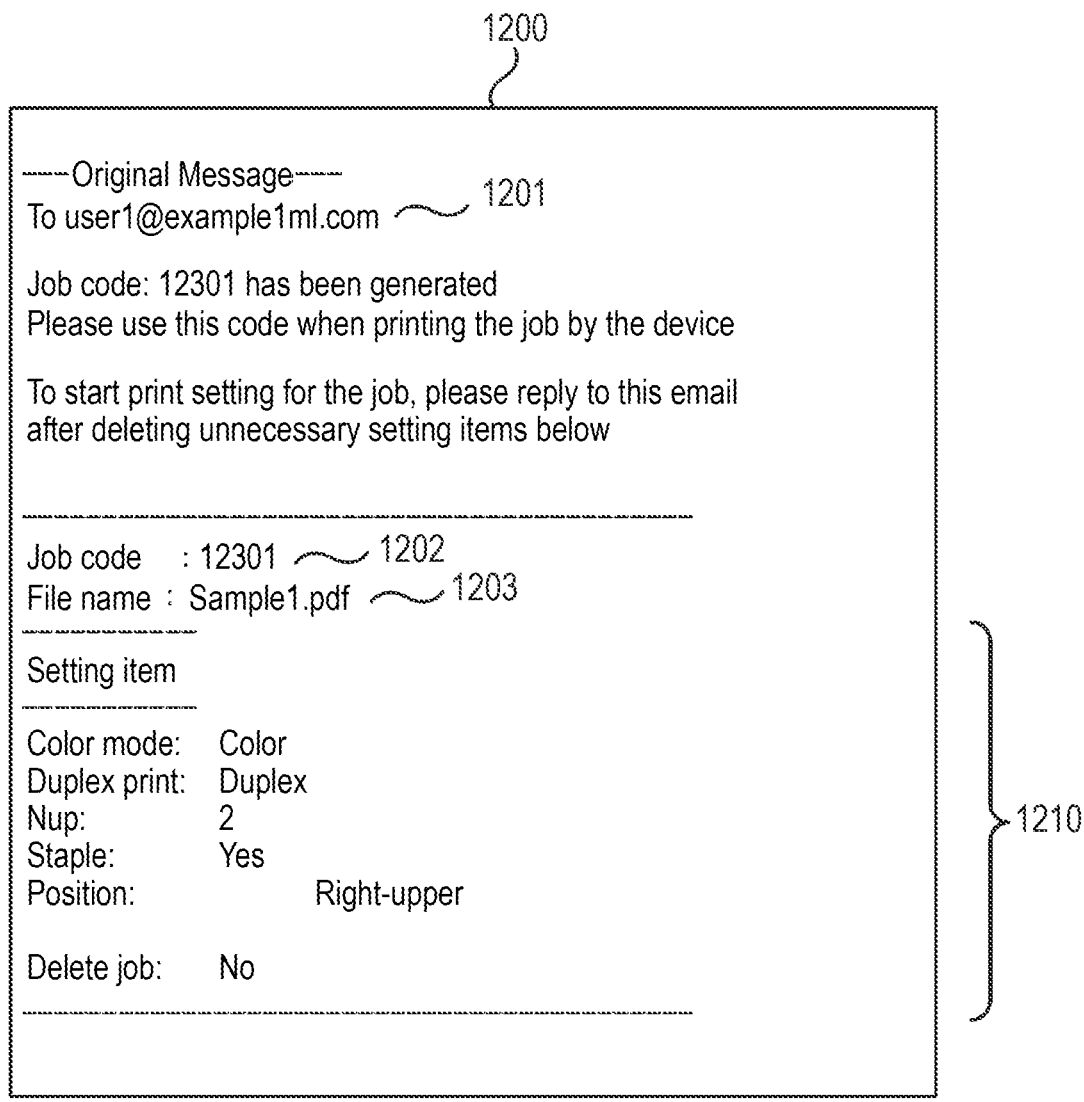
FIG. 12 illustrates an example of a print setting mail (second embodiment).

Next, a print setting mail resulted after the setting item of a print setting template of a reply mail has been edited will be described with reference to FIG. 12. FIG. 12 illustrates an example of a print setting mail 1200 describing a print setting template 1210 after edited for the print setting template 1110 of the reply mail 1100 described with FIG. 11.

In the example of FIG. 12, "Mono" and "Auto" have been deleted and "Color" is left for the color mode in the setting item. Thereby, an instruction to set the color mode of the setting item to color is provided. In such a way, the user edits the content of the print setting template 1110 of the reply mail 1100 and sends the edited print setting template 1210 in an e-mail form as the print setting mail 1200. Note that the description of a print setting template may include a descriptive language such as HTML and JAVASCRIPT (registered trademark) without being limited to a plain text. In such a case, respective setting items of the print setting template may be choices indicated by buttons. In such a case, the user sends the print setting template with any of the buttons being pressed.

The print setting data table used in the second embodiment is substantially the same as the print setting data table 700 of FIG. 7 described in the first embodiment. That is, the print setting data table 700 stores job data, a data file of a print job, print setting information, or the like generated or acquired in each step in FIG. 10.

Specifically, the print setting data table 700 stores the print job ID 701, the job code 702 generated in step S1011, and the sender mail address 704 stored in step S1013 for each print job. Further, the print setting data table 700 stores the print setting information 705 stored in step S1023 and the data file 706 generated in step S1010. Note that there may be a plurality of data files 706. Further, the print setting data table 700 stores the job accept date and time 707 that is the time email data was acquired. Unlike the first embodiment, however, the print setting URL 703 is not stored in the print setting data table 700. In such a way, the job code 702, the print setting information 705, and the like are uniquely associated with a single print job, respectively, and stored in the print setting data table 700.

Further, the sequence from completion of print setting to completion of printing at the image forming apparatus 105 in the second embodiment is the same as the sequence of FIG. 8 described in the first embodiment. Further, the internal configuration of the print job in the second embodiment is the same as that of the print data schematic diagram of FIG. 9 described in the first embodiment. The description thereof will also be omitted.

As described above, in the second embodiment, in response to receiving a print job via an e-mail from the client terminal 104, the print server 101 returns a mail describing a job code required for printing of the job at the image forming apparatus 105 and a print setting template required for print setting. This enables the user to perform the print setting when printing the print job by editing the print setting template at the client terminal.

Third Embodiment

Next, the third embodiment of the present invention will be described. In the first embodiment, when a print setting URL described in a reply mail transmitted by the print server is accessed, a print setting screen used for performing printing in a particular connected image forming apparatus is displayed.

In contrast, in the third embodiment, when a print setting URL returned from the print server is accessed, a list of image forming apparatuses that can execute a print job is displayed on a print setting screen, and one of the image forming apparatuses which performs printing can be selected from the above image forming apparatuses. Then, when one image forming apparatus is selected, only the setting items that can be set are displayed in the print setting screen in accordance with the capability of the selected image forming apparatus. Note that, since the configuration or the like of the printing system 100 are the same as those in the first embodiment, the description thereof will be omitted, and features different from the first embodiment will be mainly described here.

FIG. 13 is an example of a printer information table 1300 describing information related to capabilities of a plurality of image forming apparatuses connected to the print server 101. Note that the printer information table 1300 is generated and stored in the data storage region 316 in advance.

In the printer information table 1300 of FIG. 13, the column 1301 represents printer IDs that uniquely identify image forming apparatuses. The printer information table 1300 stores each information of the printer name 1302 indicating names of image forming apparatuses, the printer identification ID 1303 used for identifying connected image forming apparatuses, and the registration status 1304 indicating whether or not the image forming apparatuses are connected and registered to the printer server. Note that the printer identification ID 1303 and the registration status 1304 store information updated by the print service unit 310 at the point of time when each image forming apparatus is connected and registered to the print server. Further, the printer identification ID 1303 may be any identification ID that can identify each image forming apparatus, such as an IP address of the connected image forming apparatus.

Furthermore, in the example of FIG. 13, the printer information table 1300 stores the color mode 1305 regarding the color mode, the duplex 1306 regarding duplex printing, and the staple 1307 regarding staple as information related to the capability of image forming apparatus. Note that the information described in the printer information table 1300 is not limited thereto. For example, a bookbinding function, a punch function, or the like may be included as the information related to the capability of image forming apparatus.

Note that the sequence from transmission of a print job to completion of print setting in the third embodiment is substantially the same as the sequence of FIG. 4 described in the first embodiment. Accordingly, in the third embodiment, only different features will be described with reference to FIG. 4.

In the third embodiment, when generating a print setting screen in step S411 of FIG. 4, the print service unit 310 references the printer information table 1300 and generates a print setting screen in which an image forming apparatus having the registration status 1304 of "Registered" can be selected from a list. Furthermore, when an image forming apparatus is selected from the list, the print service unit 310 references the printer information table 1300 for the capability of the selected image forming apparatus and generates a print setting screen in which a setting item is updated in accordance with the capability. Accordingly, in step S424 of FIG. 4, it is possible to select an image forming apparatus which performs printing from the client terminal 104, and furthermore, setting items of the print setting screen are displayed in accordance with the capability of the selected image forming apparatus.

Figure 14:
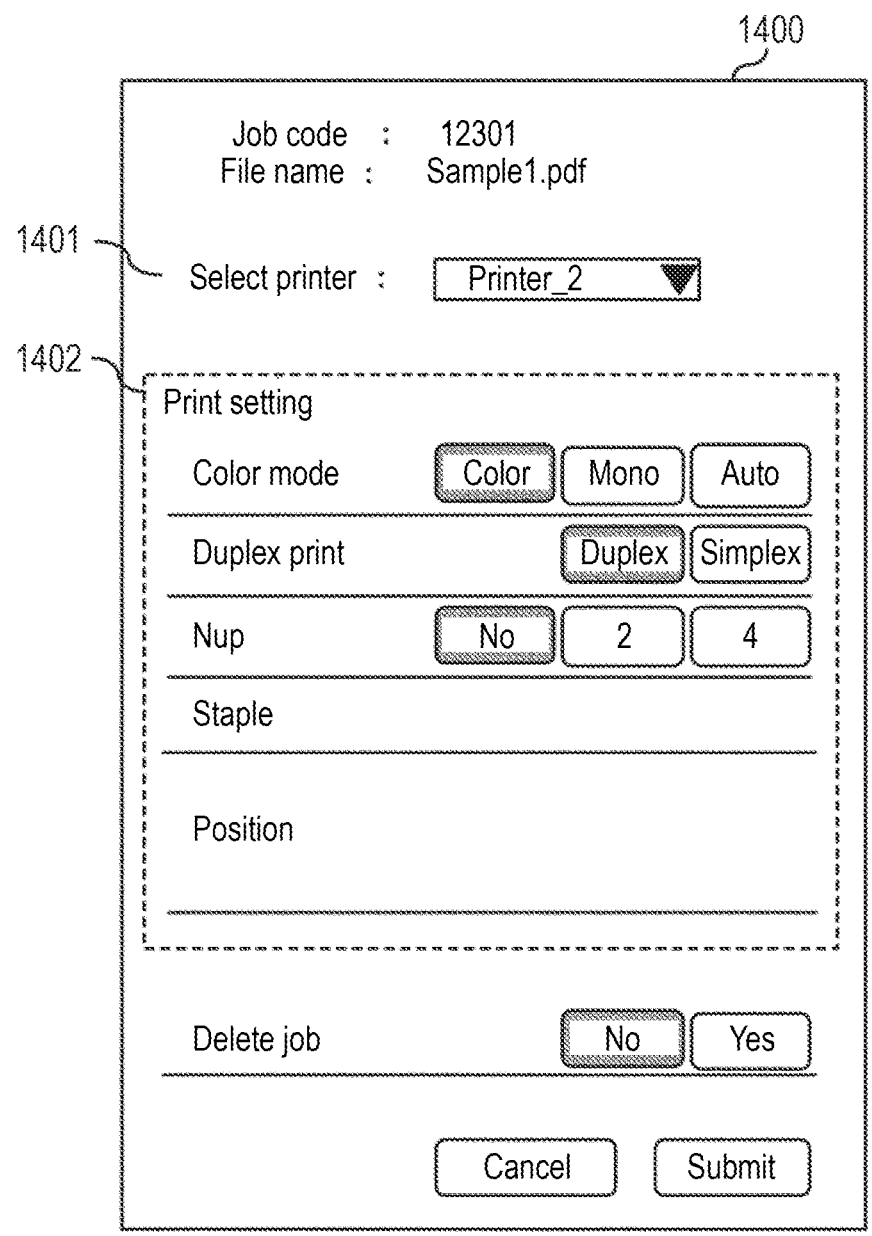
FIG. 14 illustrates an example of a print setting screen (third embodiment).

FIG. 14 illustrates an example of a print setting screen 1400 generated by the print service unit 310 in step S411 of FIG. 4 and transmitted to the client terminal 104 in step S423 in the third embodiment. In the example of FIG. 14, the reference 1401 represents a printer selection menu used for selecting an image forming apparatus. The printer selection menu 1401 is configured to select printer names 1302 of a plurality of registered image forming apparatuses from a list through a pulldown operation. In the example of FIG. 14, "Printer 2" is selected in the printer selection menu 1401.

In the print setting 1402, respective setting items used for performing print setting of a job are displayed. In the example of FIG. 14, for the image forming apparatus (having the printer ID of "2") selected in the printer selection menu 1401, the printer information table 1300 describes "color" for the color mode 1305 and "No" for the staple 1307, for example. It is therefore displayed that any one of buttons of "Color", "Mono", and "Auto" can be selected for the color mode in the print setting 1402. For the staple, however, the button is masked (not displayed) and is unable to be selected.

As described above, in the third embodiment, the print server 101 generates a print setting screen that displays a plurality of connected image forming apparatuses as a list. Accordingly, the user may select an image forming apparatus which performs printing and perform print setting in accordance with the capability of the selected image forming apparatus.

Modified Examples

Note that, although the case where print setting for an image forming apparatus that prints a print image on a sheet is performed has been illustrated as an example of an image forming apparatus in the present embodiment, the embodiment is not limited thereto. For example, the invention is also applicable to a 3D print system including a 3D printer and a document input server. In such a case, 3D data is attached to a mail. Further, in such a case, in print setting performed after document input of 3D data via a mail, the number of a molding object to be created, a layering pitch, a filling density, a type of a molding material to be used, or the like can be set.

According to the present invention, it is possible to easily perform print setting for a print job transmitted via an e-mail and then perform printing.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The present invention is not limited to the embodiments described above, various modifications are possible based on the spirit of the present invention, and such modifications are not to be excluded from the scope of the present invention. That is, all the configurations combining each of the configuration examples described above and the modification thereof are included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-051013, filed Mar. 23, 2020, which is hereby incorporated by reference herein in its entirety.

What is claimed is:

1. A printing control method of performing mail reception and printing, and the method comprising:
   receiving an electronic mail including print data transmitted from an information processing terminal and storing the print data;
   generating a one-time key required when a user starts printing of the print data and storing the generated one-time key in association with the print data;
   generating a uniform resource locator (URL) required for accessing a setting screen used for setting a condition used when printing of the print data is performed; and
   transmitting the generated URL and the generated one-time key to a user who transmitted the electronic mail including the print data.

2. The printing control method according to claim 1, the method further comprising:
   in the transmission, transmitting, to the user, an electronic mail in which the generated URL and the generated one-time key are included in a message body.

3. The printing control method according to claim 2, wherein the message body includes first information indicating that the generated one-time key is required at the time of printing and second information indicating that access to the generated URL enables print setting to be performed.

4. The printing control method according to claim 1, the method further comprising:
   responding with the setting screen corresponding to the URL when a connection request including the generated URL is received.

5. The printing control method according to claim 4, the method further comprising:
   receiving setting information that was set based on a user operation via the setting screen; and
   associating the received setting information with the stored print data.

6. The printing control method according to claim 4, wherein the setting screen includes a display item used for specifying a printing apparatus used for the printing.

7. The printing control method according to claim 4, wherein the setting screen includes a display item used for cancelling the printing.

8. The printing control method according to claim 1, the method further comprising:
   responding with an authentication screen corresponding to the URL when a connection request including the generated URL is received, and
   responding with the setting screen corresponding to the URL, in a case where one-time key information that was set based on a user operation via the authentication screen is received and it is determined that the received one-time key information corresponds to the generated one-time key.

9. The printing control method according to claim 1, the method further comprising:
   receiving information corresponding to the generated one-time key from a printing apparatus;
   determining whether or not print data to be output is present based on the received information; and
   transmitting the print data to be output to the printing apparatus when it is determined that the print data to be output is present.

10. A server apparatus comprising:
    at least one memory that stores a set of instructions; and
    at least one processor that executes the instructions, the instructions, when executed, causing an image forming apparatus to perform operations comprising:
    receiving an electronic mail including print data transmitted from an information processing terminal and storing the print data in a predetermined storage region;
    generating a one-time key required when a user starts printing of the print data and storing the generated one-time key in the predetermined storage region in association with the print data;
    generating a uniform resource locator (URL) required for accessing a setting screen used for setting a condition used when printing of the print data is performed; and
    transmitting the generated URL and the generated one-time key to a user who transmitted the electronic mail including the print data.

* * * * *